(12) United States Patent
Chen et al.

(10) Patent No.: US 10,075,341 B2
(45) Date of Patent: Sep. 11, 2018

(54) RELATIONAL STRUCTURE FOR WIRELESS NODES AND OPTIMIZING METHOD FOR THE RELATIONAL STRUCTURE

(71) Applicant: DELTA ELECTRONICS, INC., Taoyuan County (TW)

(72) Inventors: Meng-Seng Chen, Taoyuan County (TW); Tien-Szu Lo, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 276 days.

(21) Appl. No.: 14/966,051

(22) Filed: Dec. 11, 2015

(65) Prior Publication Data
US 2016/0191321 A1    Jun. 30, 2016

(30) Foreign Application Priority Data

Dec. 26, 2014    (TW) .............................. 103145624 A

(51) Int. Cl.
*G06F 15/177*    (2006.01)
*H04L 12/24*    (2006.01)

(52) U.S. Cl.
CPC .......... *H04L 41/0889* (2013.01); *H04L 41/26* (2013.01); *H04L 41/0806* (2013.01); *H04L 41/0886* (2013.01)

(58) Field of Classification Search
None
See application file for complete search history.

(56) References Cited

U.S. PATENT DOCUMENTS

| | | | |
|---|---|---|---|
| 8,908,562 B2 | 12/2014 | Zhang et al. | |
| 9,288,114 B2 | 3/2016 | Zhang et al. | |
| 9,474,101 B2 | 10/2016 | Zhang et al. | |
| 2004/0210348 A1 | 10/2004 | Imhof et al. | |
| 2007/0095906 A1 | 5/2007 | Camilleri et al. | |
| 2010/0079743 A1* | 4/2010 | Hidaka | G03F 7/70208 355/74 |

(Continued)

FOREIGN PATENT DOCUMENTS

| | | |
|---|---|---|
| CN | 1223428 | 7/1999 |
| CN | 101241367 | 8/2008 |

(Continued)

OTHER PUBLICATIONS

Office Action dated Jan. 12, 2016 from corresponding application No. TW 103145624.

(Continued)

*Primary Examiner* — Umar Cheema
*Assistant Examiner* — Gregory P Tolchinsky
(74) *Attorney, Agent, or Firm* — Hauptman Ham, LLP

(57) ABSTRACT

An optimizing method for a relational structure is presented. Firstly, a zone controller (ZC) receives a relational structure information related to a located zone and executes a classification for multiple sub-relational structure information thereof. The ZC then executes searching and calculation respectively based on different types of the sub-relational structure information, and receives multiple optimum solutions for each type of the sub-relational structure information respectively. Finally, the ZC establishes different types of sub-relational structures based on the multiple optimum solutions, wherein each sub-relational structure comprises at least one wireless node of the located zone, and connects with the multiple sub-relational structures for establishing the relational structure.

18 Claims, 12 Drawing Sheets

(56) References Cited

U.S. PATENT DOCUMENTS

| | | | |
|---|---|---|---|
| 2010/0111146 A1* | 5/2010 | Nakagawa | H04B 15/04 375/220 |
| 2011/0164821 A1* | 7/2011 | Otts | G06K 9/4633 382/195 |
| 2013/0086066 A1* | 4/2013 | Anderson, Jr. | H04L 12/2807 707/737 |
| 2013/0086497 A1* | 4/2013 | Ambuhl | G05B 15/02 715/762 |
| 2013/0113936 A1* | 5/2013 | Cohen | G07B 15/02 348/148 |
| 2013/0197955 A1* | 8/2013 | Dillon | H04W 40/246 705/7.13 |
| 2013/0294285 A1 | 11/2013 | Zhang et al. | |
| 2014/0039685 A1* | 2/2014 | Blount | G05B 15/02 700/276 |
| 2014/0141798 A1* | 5/2014 | Chen | H04W 4/02 455/456.1 |
| 2015/0098361 A1 | 4/2015 | Zhang et al. | |
| 2016/0157298 A1 | 6/2016 | Zhang et al. | |

FOREIGN PATENT DOCUMENTS

| | | |
|---|---|---|
| CN | 101764724 | 6/2010 |
| EP | 2 605 610 | 6/2013 |

OTHER PUBLICATIONS

Office Action dated Mar. 28, 2018 from corresponding application No. CN201410826384.2.

\* cited by examiner

US 10,075,341 B2

RELATIONAL STRUCTURE FOR WIRELESS NODES AND OPTIMIZING METHOD FOR THE RELATIONAL STRUCTURE

FIELD OF INVENTION

The present invention relates to wireless nodes and more particularly relates to relational structure of wireless nodes and optimized method thereof.

BACKGROUND OF INVENTION

Generally, to perform smart control in a small area, a zone controller (ZC) and multiple wireless nodes need to be disposed in the area. The wireless nodes may include sensors for detecting indoor or outdoor environment parameters in the area and may include equipment controllers for controlling electronic devices in the area.

In related technology of this technical field, management people may configure a relational structure information in such zone controller. The relational structure information includes structures that are necessary for the area. For example, the zone controller needs to be connected to two equipment controllers like a fan controller and a light controller, and the two equipment controllers need to be respectively connected to one sensor like a temperature sensor and an infrared sensor. With such relational structure information, the zone controller may automatically search the two equipment controllers located nearby after the zone controller is powered on. In addition, the zone controller instructs the two equipment controllers to separately search and connect to one sensor located nearby to automatically establish the structure in the area.

However, in related technology solutions, the zone controller cannot determine relation levels to the equipment controllers and relation levels among the sensors. Therefore, an automatically established structure often fails to meet practical needs.

For example, when the zone controller automatically connects to a fan controller and instructs the fan controller to automatically connect to a temperature sensor. However, the fan controller is used for controlling a fan located at A position, but the temperature sensor is located at B position. If the fan controller controls the rotation speed of the fan at A position according to the environment parameter detected by the temperature sensor located at B position, the environment is not adjusted to the most comfortable status to meet the real need of users.

In addition, management people need to spend lots of time to fine tune related configuration after the structure is automatically established. This is inconvenient and lacks the real meaning of automatic processing.

SUMMARY OF INVENTION

A major objective of the present invention is to provide a relational structure and its optimization method for wireless nodes to perform automatic connection among the wireless nodes for establishing a relational structure meeting requirements and for ensuring multiple wireless nodes in the same structure having the largest relation level.

To achieve the aforementioned objective, a zone controller firstly receives relational structure information of the area where the zone controller is located, and classifies multiple sub-relational structure information in the relational structure information. The zone controller performs respective searching and calculating for different types of the multiple sub-relational structure information to obtain optimized search result for each type. The zone controller establishes a sub-relational structure for each type according to multiple optimized search results. Each sub-relational structure respectively contains one or more wireless nodes located in the area. Finally, the zone controller establishes the relational structure for the located area according to the multiple sub-relational structures.

Compared with conventional technology, the present invention enables multiple wireless nodes to be connected automatically to establish a relational structure matching the needs of the located area with only relational structure information provided to the multiple wireless nodes. As such, management people do not need to manually configure connection setting after the wireless nodes are installed in the area to save a lot of human and time cost.

Furthermore, before the wireless nodes are connected, relation levels among them are calculated and wireless nodes with highest relation levels are firstly considered when connection is established. According, the number and time of fine tuning by management people are effectively decreased after the relational structure is automatically established.

DETAILED DESCRIPTION

A first embodiment and associated drawings are explained as follows.

Figure 1:
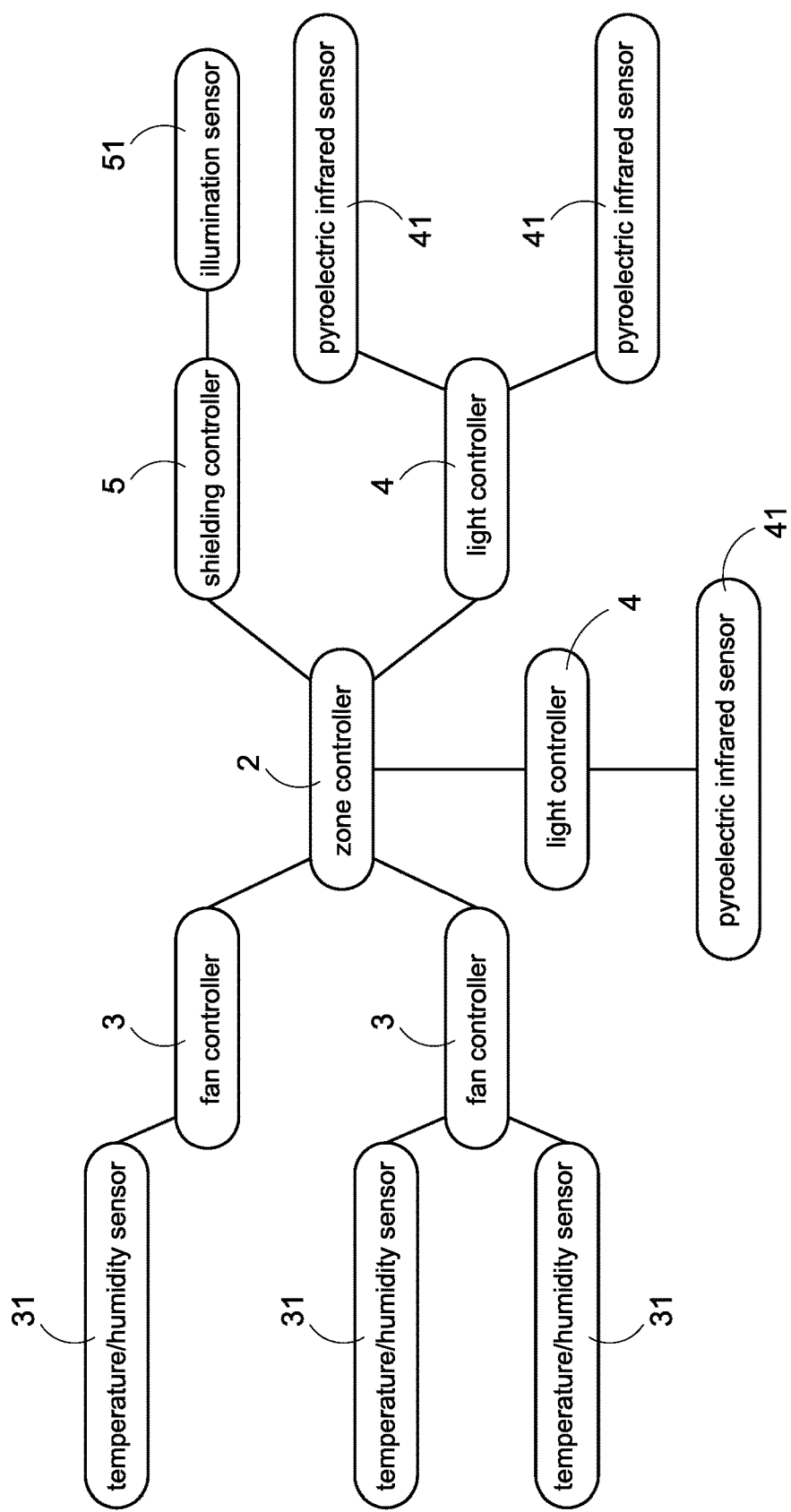
FIG. 1 is a relational structure diagram of a first embodiment according to the present invention.

FIG. 1 is a relational structure diagram of a first embodiment according to the present invention. FIG. 1 illustrates a relational structure 1 of multiple wireless nodes that are located in the same area. In this embodiment, the area may refer to a room, a meeting room, an office, a lobby, a floor or any other geographic area. Such examples are not for limitation for the invention scope.

As illustrated in FIG. 1, the relational structure 1 of the first embodiment has three tiers. The first tier is a zone controller (ZC) 2 of the area, the second tier includes multiple equipment controllers or multiple sensors connected to the zone controller 2, and the third tier includes multiple sensors used for collecting indoor or outdoor environment parameters. The equipment controllers respectively connect to electronic devices in the area like a fan, an air conditioner, a light, etc. and control the electronic devices according to the collected environment parameters of the sensors to adjust environment status of the area. The zone controller 2 sends instructions to the equipment controllers and the sensors according to real needs in the area. As such, by controlling the zone controller 2, the equipment controllers and the sensors are used to automatically adjust environment parameters of the area. Nevertheless, the aforementioned configuration is only for example, instead of limiting the invention scope. For example, the relational structure 1 may have only two tiers or more than three tiers.

In the embodiment illustrated in FIG. 1, the first tier of the relational structure 1 includes the zone controller 2. The second tier of the relational structure 1 includes two fan controllers (FC) 3, two light controllers (LC) 4, and a shielding controller (SC) 5. The two fan controllers 3 connect and control the fans (not shown) in the area, the two light controllers 4 connect and control the lights (not shown) in the area, and the shielding controller 5 connects and controls a shutter window (not shown) in the area.

The third tier of the relational structure 1 includes three temperature/humidity sensors 31, three pyroelectric infrared sensors 41 and an illumination sensor 51. The three temperature/humidity sensors 31 respectively connect the two fan controllers 3 to detect the temperature and humidity of the area and provide temperature and humidity information to the two fan controllers 3 for the two fan controllers to adjust rotation speed of associated fans based on the detected temperature and humidity information. The three pyroelectric infrared sensors 341 respectively connect to the two light controllers 4 to detect whether any human enters or exists and provide detected result to the two light controllers 4 for the two light controllers 4 to turn on or turn off associated lights based on the detected result. The illumination sensor 51 connects to the shielding controller 5 to detect outdoor illuminant strength to provide detected illumination strength information to the shielding controller 5 for the shielding controller 5 to open or close the shutter window based on the detected illumination strength information.

Please be noted that aforementioned configuration is only an example, instead for limiting the invention scope. In other embodiments, the temperature/humidity sensor 31, the pyroelectric infrared sensor 41 and/or the illumination sensor 51 may also be placed in the second tier of the relational structure 1 to be directly connected to the zone controller 2 to provide detected results directly to the zone controller 2 for necessary calculation and analysis.

Figure 2:
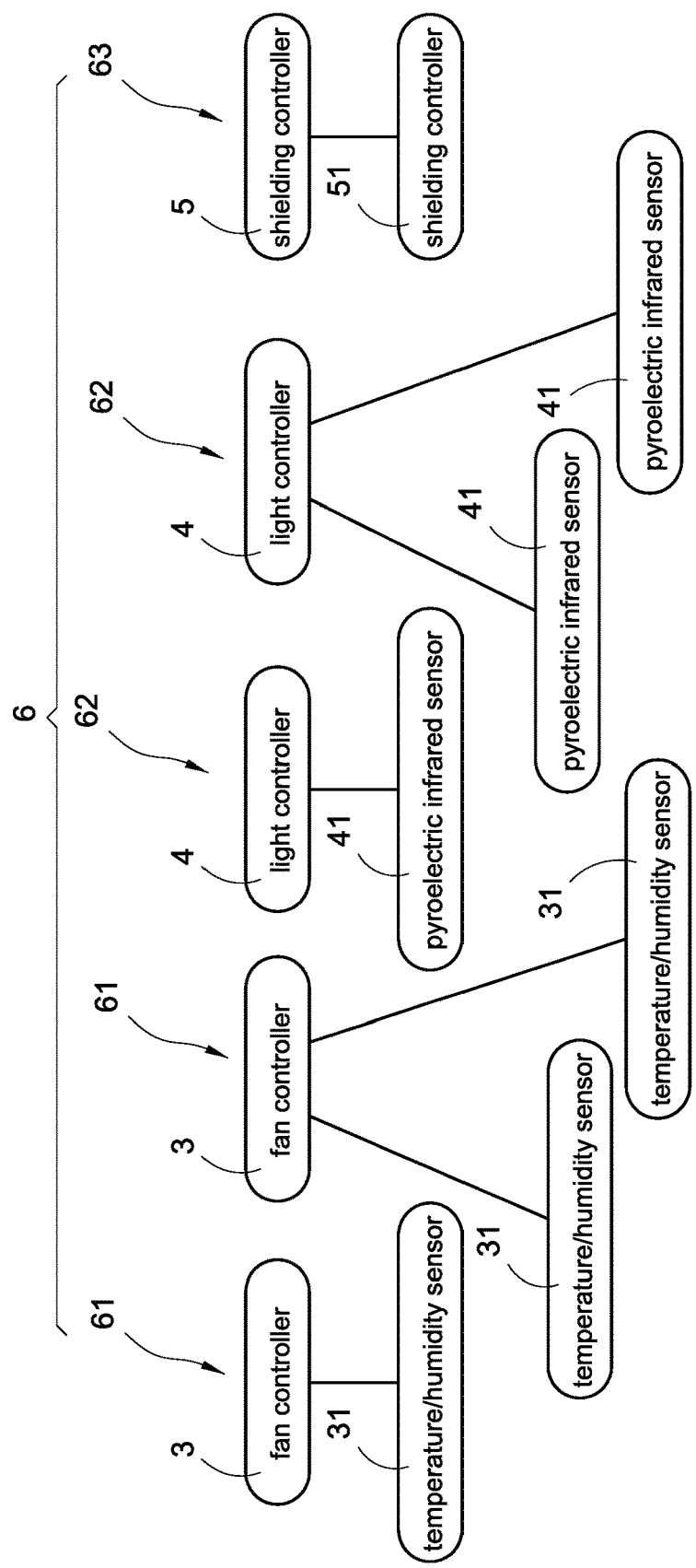
FIG. 2 is a sub-relational structure diagram of the first embodiment according to the present invention.

Please refer to FIG. 2, which is a sub-relational structure diagram of the first embodiment. The first tier of the relational structure 1 only includes the zone controller 2. The zone controller 2 therefore may retrieve multiple sub-relational structures 6 from the relational structure 1. In the optimization method of the present invention, multiple optimized sub-relational structures 6 meeting the needs are created at first and then the zone controller 2 assembles the multiple optimized sub-relational structures 6 into an optimized relational structure 1 which will be explained as follows.

In this embodiment, the sub-relational structures 6 include at least one equipment controller and at least one sensor. The zone controller 2 classifies the sub-relational structures 6 according to types of the equipment controllers and the sensors for the sub-relational structures 6. In the example illustrated in FIG. 2, the two sub-relational structures including the fan controller 3 and the temperature/humidity sensor 31 are classified as a first sub-relational structure 61. The two sub-relational structures including the light controller 4 and the pyroelectric infrared sensor 41 are classified as a second sub-relational structure 62. The sub-relational structure including the shielding controller 5 and the illumination sensor 51 are classified as a third sub-relational structure 63.

As mentioned above, an advantage for classifying these sub-relational structures is to dramatically decrease data flows and calculation burden when the zone controller 2 and the equipment controllers perform optimization search to dramatically decrease search time. For example when the optimized result of the first sub-relational structure 61 is to be found, the zone controller 2 only needs to search all fan controllers 3 located nearby, instead of searching the light controller 4 and the shielding controller 5 and calculating the relation level between the zone controller 2 and the light controller 4 and the relation level between the zone controller 2 and the shielding controller 5. Similarly, the fan controller 3 only needs to search all temperature/humidity sensors 31, instead of searching the pyroelectric infrared sensor 41 and the illumination sensor 51 and calculating the relation level between the fan controller 3 and the pyroelectric infrared sensor 41 and the relation level between the fan controller 3 and the illumination sensor 51.

In this invention, management people create a relational structure information in text or graphic form in advance according the relational structure 1 needed for the area, and provide the relational structure information to the zone controller 2 so that when the zone controller 2 is powered on, the zone controller 2 automatically searches and creates the relational structure 1 matching the content of the relational structure information. In this example, the relational structure information records the zone controller, type and number of the equipment controllers included in the relational structure 1, and type and number of the sensors included in the relational structure 1, and records connection relation among the zone controller 2, the equipment controllers and the sensors, e.g. the relational structure 1 illustrated in FIG. 1.

Figure 3:
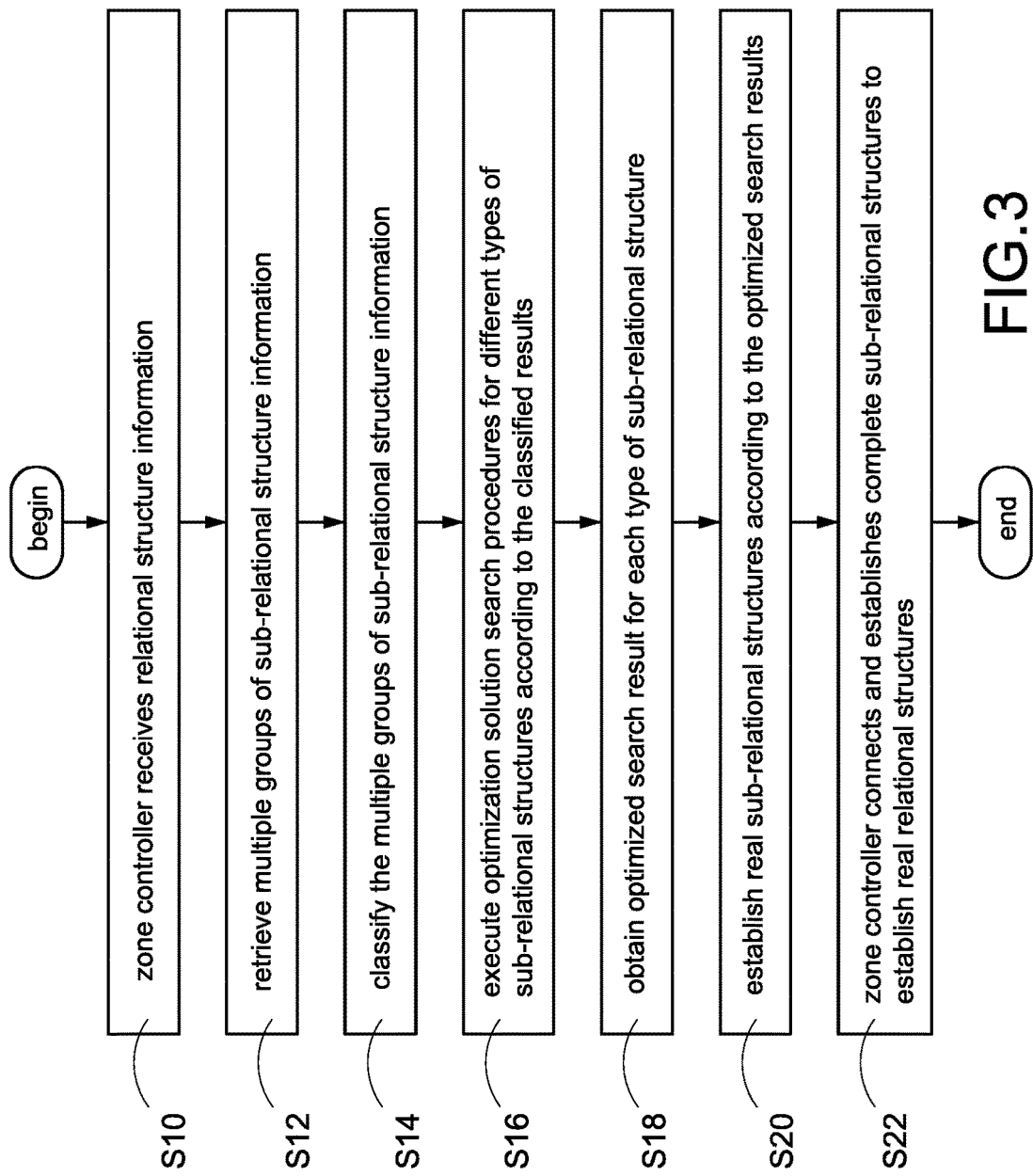
FIG. 3 is a flowchart for establishing the relational structure of the first embodiment according to the present invention.

Please refer to FIG. 3, which is a flowchart for establishing the relational structure of the first embodiment according to the present invention. When the zone controller 2 tries to automatically creates the relational structure 1 of the located area, the relational structure information is received first (step S10). Then, multiple groups of sub-relational structure information is retrieved from the relational structure information (step S12). In other words, the content of the relational structure information includes the zone controller 2 and multiple groups of sub-relational structure information.

In the embodiment, the number of multiple groups of sub-relational structure information corresponds to the number of the sub-relational structures 6 included by the relational structure 1. The content of each sub-relational structure information respectively includes type and number of equipment controllers corresponding to the sub-relational structures 6, type and number of the sensors, and connection relation between the equipment controllers and the sensors, e.g. the sub-relational structures 6 illustrated in FIG. 2.

Next, the zone controller 2 classifies the sub-relational structure information (step S14). As mentioned above, the zone controller 2 classifies the sub-relational structure information according to the type of the equipment controllers and sensors included in the sub-relational structure information. As illustrated in FIG. 2, the zone controller 2 classifies the sub-relational structure information including the fan controller 3 and the temperature/humidity sensor 31 as one type, classifies the sub-relational structure information including the light controllers 4 and the pyroelectric sensors 41 as one type, and classifies the sub-relational structure information including the shielding controller 5 and the illumination sensor 51 as one type. In other words, although there are five groups of sub-relational structures 6 illustrated in FIG. 2, i.e. five groups of sub-relational structure information, the zone controller 2 only classifies the five groups of sub-relational structure information into three types.

After the step of S14, the zone controller 2 executes optimization search procedures for each type of sub-relational structures 6 according to the classified result (step S16). In step S16, the zone controller 2 transmits the sub-relational structure information to all equipment controllers of the same type. These equipment controllers search all sensors of the same types, calculates relation levels to the sensors and keep one or more sensors matching the sub-relational structure information and having highest relation levels according to the received sub-relational structure information.

After the step S16, the zone controller 2 retrieves the optimized search result for each type of the sub-relational structures. As such, the equipment controllers are controlled according the optimized search result to establish real sub-relational structures 6 (step S20). After all types of sub-relational structures 6 are established, the zone controller 2 connects the completed sub-relational structures 6 to establish a real relational structure 1 (step S22).

Figure 4:
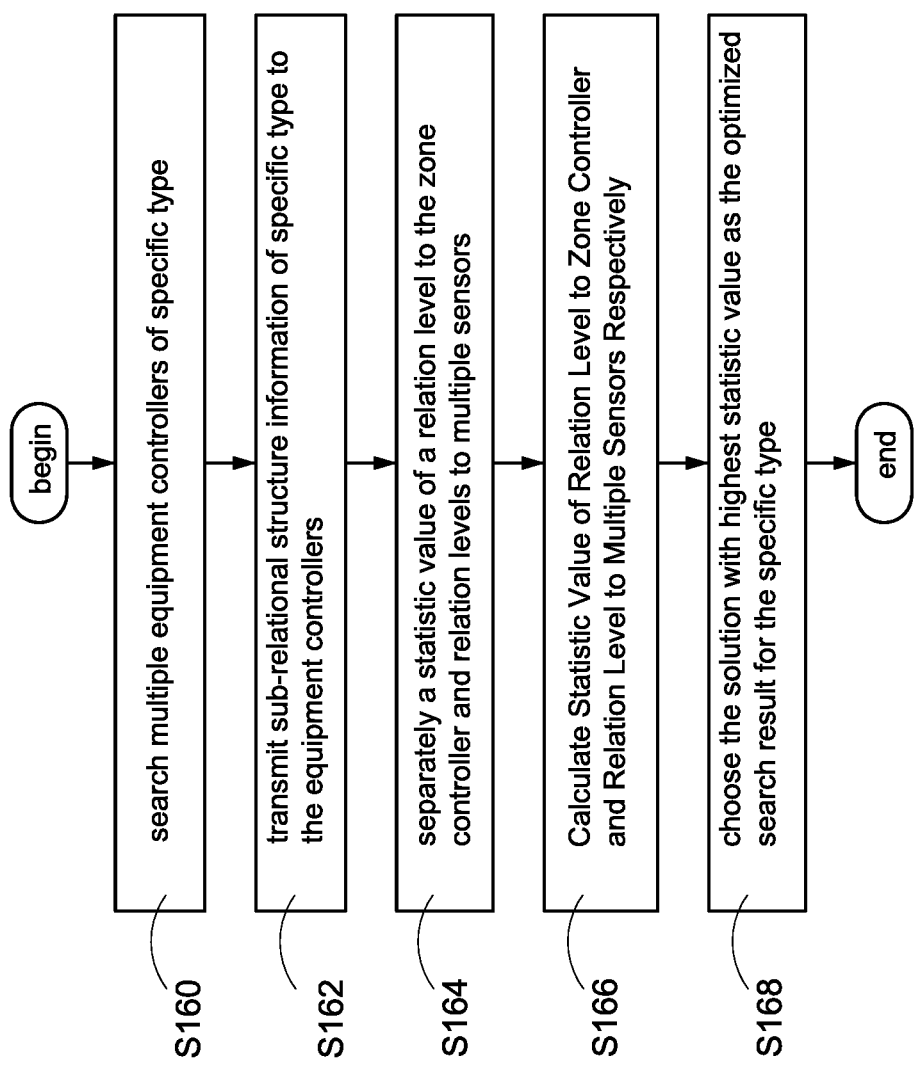
FIG. 4 is an optimized flowchart of the first embodiment according to the present invention.

Please refer to FIG. 4, which is an optimized flowchart of the first embodiment. Each step is used for explaining the step S16 as mentioned above in more details.

When the zone controller 2 executes the optimization search procedure, multiple equipment controllers in a specific type meeting a standard value are searched first (step S160). The sub-relational structure information of the specific type is also transmitted to the multiple equipment controllers (step S162).

Specifically, in the step of S160, the zone controller 2 searches multiple equipment controllers located nearby and calculates respectively a relation level, e.g. a first relation level, to these equipment controllers and keeps multiple equipment controllers with a first relation level higher than the standard value. On the other hand, the zone controller 2 ignores multiple equipment controllers having first relation levels lower than the standard value.

Figure 6:
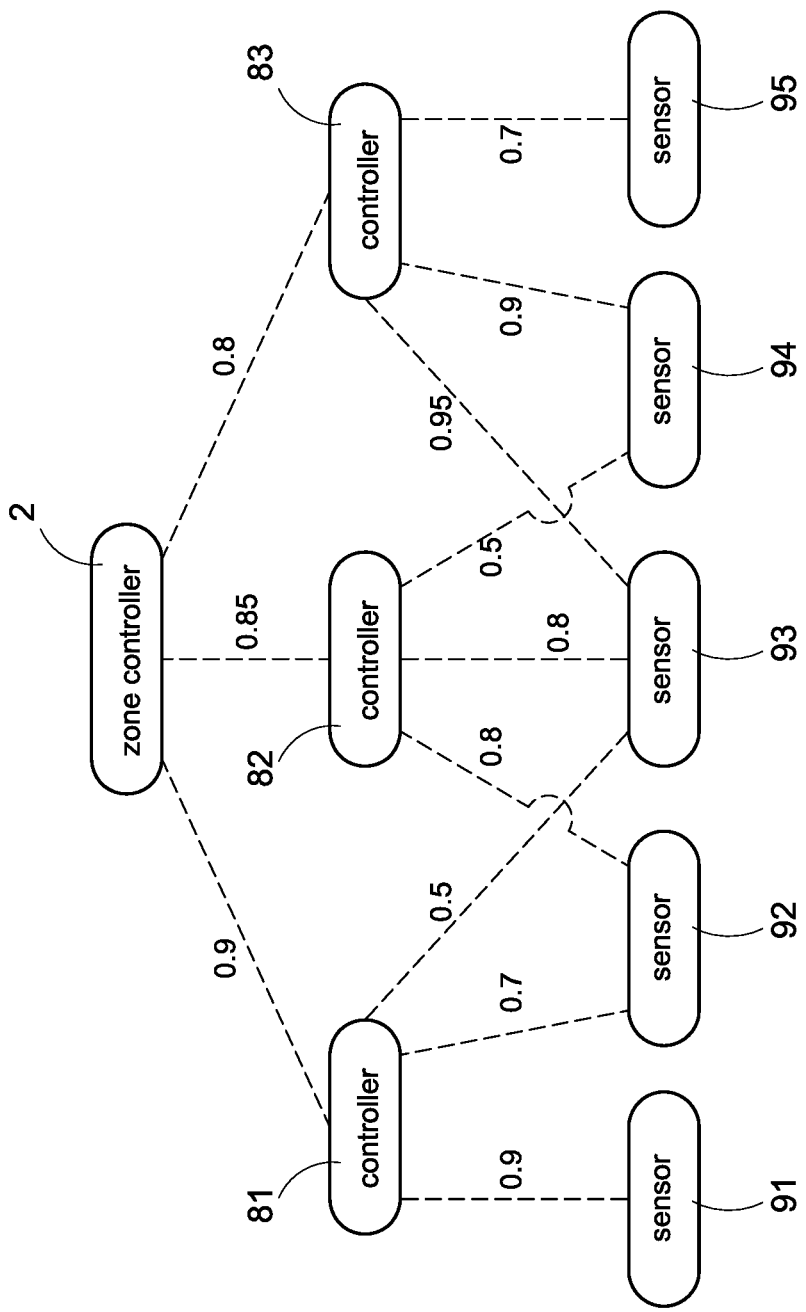
FIG. 6 is a first searching operation diagram of the first embodiment according to the present invention.

In this embodiment, the relation level may be set as larger means better, e.g. the standard value setting larger or equal to 0.5 if 1 is set as the best. But such configuration is not as limitation for the invention scope. For example, if the zone controller 2 searches ten equipment controllers of one type located nearby, three equipment controllers having the first relation levels to the zone controller 2 larger than 0.5 while other seven equipment controllers having the first relation levels to the zone controller 2 smaller than 0.5, the zone controller 2 only keeps the three equipment controllers having the first relation levels larger than 0.5 as illustrated in FIG. 6 and transmits the sub-relational structure information to the three equipment controllers.

In other embodiments, the relation level can be set as smaller means better, e.g. the standard value set as smaller or equals to 0.5 when 0 is set as best. In this embodiment, after the zone controller 2 searches multiple equipment controllers located nearby and calculates the first relation levels to these equipment controllers, multiple equipment controllers are kept with first relation levels smaller or equal to the standard value. On the other hand, the zone controller 2 ignores multiple equipment controllers having their first relation levels larger than the standard value. In the following examples, the relation level is set as larger for better.

In the invention, the first relation level may correspond to distance, signal strength or other parameters between the zone controller 2 and the equipment controllers. When the distance between the zone controller 2 to the equipment controllers is more near or the signal strength is stronger, the first relation level is higher. The distance and signal strength information may be obtained by positioning technology and not repeated in more details here. In addition, through positioning technology, the zone controller 2 may determine whether the equipment controllers are located in the same area, also reference floor plans of the located building. For example, if the zone controller 2 has higher relation level to an equipment controller A but the equipment controller A is located in another area, the zone controller 2 may also ignore the equipment controller A.

After the step S162, each multiple equipment controller searches multiple sensors of the same type according to the received sub-relational structure information respectively and calculates relation level, e.g. a second relation level to the multiple sensors respectively, and keeps multiple sensors with their second relation levels satisfying the standard value (step S164). In this example, the multiple equipment controllers may also determine to keep multiple sensors with their second relation levels larger or equal to the standard value when the relation level is set larger for better or keeps sensors with the second relation levels smaller or equal to the standard value when the relational level is set smaller for better. Please be noted that such configuration is not limitation for the invention scope.

Next, these equipment controllers respectively calculates a statistic value of the first relation level to the zone controller 2 and the second relation levels to the sensors (step S166). The optimized solution with the best statistic value is chosen as the optimized search result for the specific type (step S168). Finally, the optimized search result is provided to the zone controller 2. In this embodiment, the statistic value may be a multiplication value of the first relation level and the second relation level or a summed value of the first relation level and the second relation level. The multiplication value or the summed value with the largest value may be chosen when relation level is set larger for better. Alternatively, the multiplication value or the summed value with the smallest value may be chosen when relation level is set smaller for better. Please be noted that such configuration is not limitation for the invention scope.

Please be noted that when the relational structure 1 includes multiple sub-relation structures of the same type, the multiple equipment controllers may receive multiple sub-relational structure information. In such case, the multiple equipment controllers may respectively calculate multiple groups of solutions with highest statistic values and the groups of solutions correspond to different sub-relational structure information. When the search is done, the zone controller 2 receives multiple groups of best search results for multiple groups of the specific type and accordingly establishes the sub-relational structures 6 for multiple groups for the specific type.

Figure 5:
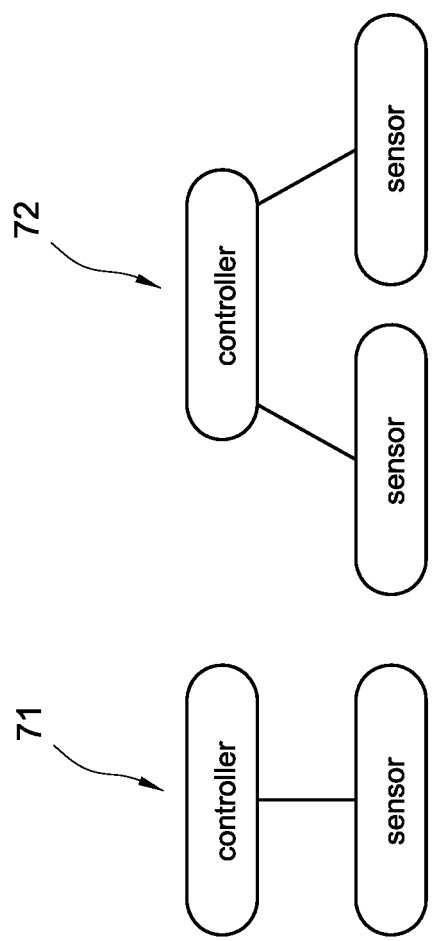
FIG. 5 is a sub-relational structure information diagram of the first embodiment according to the present invention.

Please refer to FIG. 5, which is a sub-relational structure information diagram of the first embodiment according to the present invention. FIG. 5 illustrates a first sub-relational structure information 71 and a second sub-relational structure information 72. The two sub-relational structure information 71 and 72 belong to the same type. The first sub-relational structure information 71 includes a controller and a sensor connected to the controller. The second sub-relational structure 72 includes another controller and two sensors connected to the controller. In other following disclosure, the two sub-relational structure information 71 and 72 are taken as examples for explaining how search operations are executed.

Please refer to FIG. 6 to FIG. 9, which illustrate first searching operation to fourth searching operation of the first embodiment according to the present invention. In the embodiment of FIG. 6, the zone controller 2 searches multiple controllers located nearby according to the type of the two sub-relational structure information 71 and 72 and respectively calculates relation levels to multiple controllers to get three controllers 81-83 satisfying needs (with relation levels larger than the standard value). In this example, the zone controller 2 has a relation level of 0.9 to the controller 81, a relation level of 0.85 to the controller 82 and a relation level of 0.8 to the controller 83.

Please be noted that the controllers 81-83 may have tag functions. When the controllers 81-83 are connected to other zone controllers, the zone controller 2 may not include a tagged controller in its search result. For example, even a controller A has a relation level of 0.99 (very close or high signal strength) to the zone controller 2, if the controller A is tagged (e.g. connected by a neighbor zone controller), the zone controller 2 excludes the controller A that is tagged.

After the zone controller 2 finishes searching, the two relational structure information 71 and 72 are sent to the three controllers 81-83. After the three controllers 81-83 receive the two relational structure information 71 and 72, the three controllers may start searching multiple sensors of the same type located nearby ad calculate their relation levels to the sensors respectively to get one or more sensors with relation levels larger than standard values.

As illustrated in FIG. 6, the controller 81 searches three sensors 91-93 and the controller 81 has relation levels of 0.9, 0.7 and 0.5 to the three sensors. The controller 82 searches three sensors 92-94 and the controller 82 has relation levels of 0.8, 0.8 and 0.5 to the three sensors 92-94. The controller 83 searches three sensors 93-95 and the controller 83 has relation levels of 0.95, 0.9 and 0.7 to the three sensors 93-95.

Please be noted that these sensors 91-95 are the same as the controllers 81-83 for having the tag functions. When the sensors 91-95 are connected, they are tagged so that the controllers 81-83 exclude sensors 91-95 that are tagged in their search results. As such, the search time and calculation time of relation level are decreased and it is avoided that the zone controller 2 and the controllers 81-83 connect to wireless nodes having high relation levels but located in different areas, e.g. a next room or another office.

Figure 7:
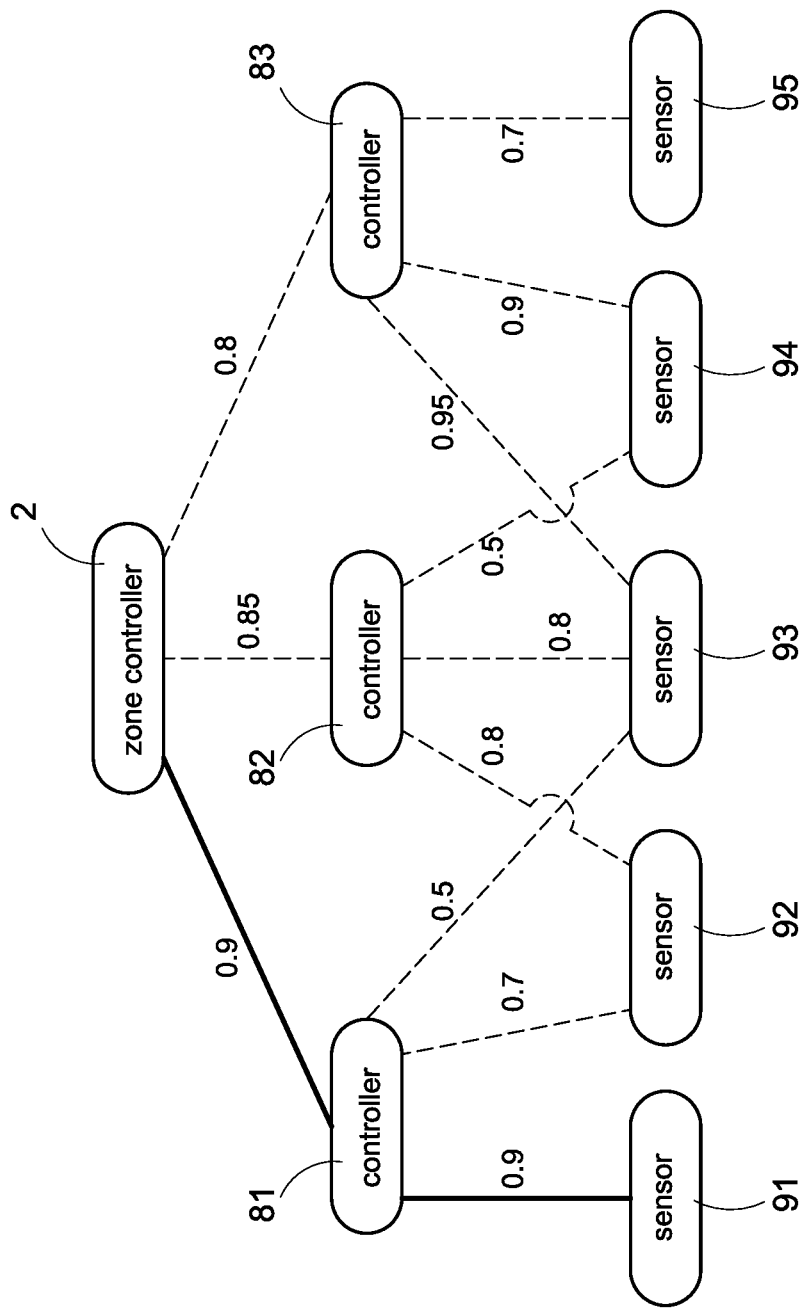
FIG. 7 is a second searching operation diagram of the first embodiment according to the present invention.

As shown in FIG. 7, the controller 81 determines connecting to the sensor 91 as the best solution after searching and calculation according the first sub-relational structure information 71. Specifically, if the statistic value is a multiplication value, and the controller 81 has a relation level of 0.9 to the zone controller 2 and has a relation level of 0.9 to the sensor 91, the multiplication value is 0.9×0.9=0.81, which is the highest among all wireless node combinations. Therefore, the controller 81 keeps the search result as the optimized search result corresponding to the first sub-relational structure information 71.

Figure 8:
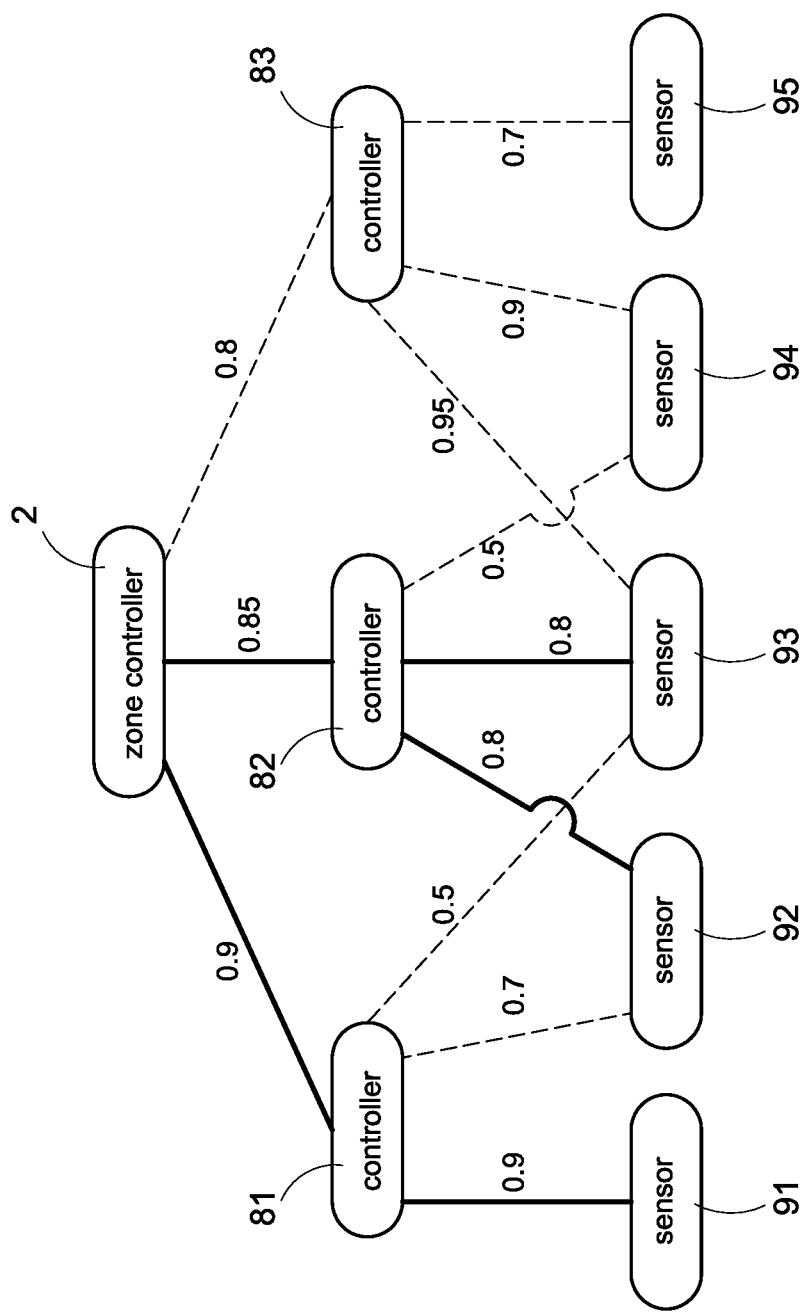
FIG. 8 is a third searching operation diagram of the first embodiment according to the present invention.

Next, as illustrated in FIG. 8, the controller 81 is set as the provider of the best search result corresponding to the first sub-relational structure information 71, and the controller 82 starts searching and calculation based on the second sub-relational structure information 72 directly. In this embodiment, after the controller 82 performs searching and calculation, connecting to the two sensors 92, 93 are found as the best solution. Specifically, the controller 82 has a relation level of 0.85 to the zone controller 2 and has a relation level of 0.8, i.e. (0.8+0.8)/2, to the two sensors 92 and 93, and their multiplication value is 0.85×0.8=0.68. The controller 82 keeps the search result.

Figure 9:
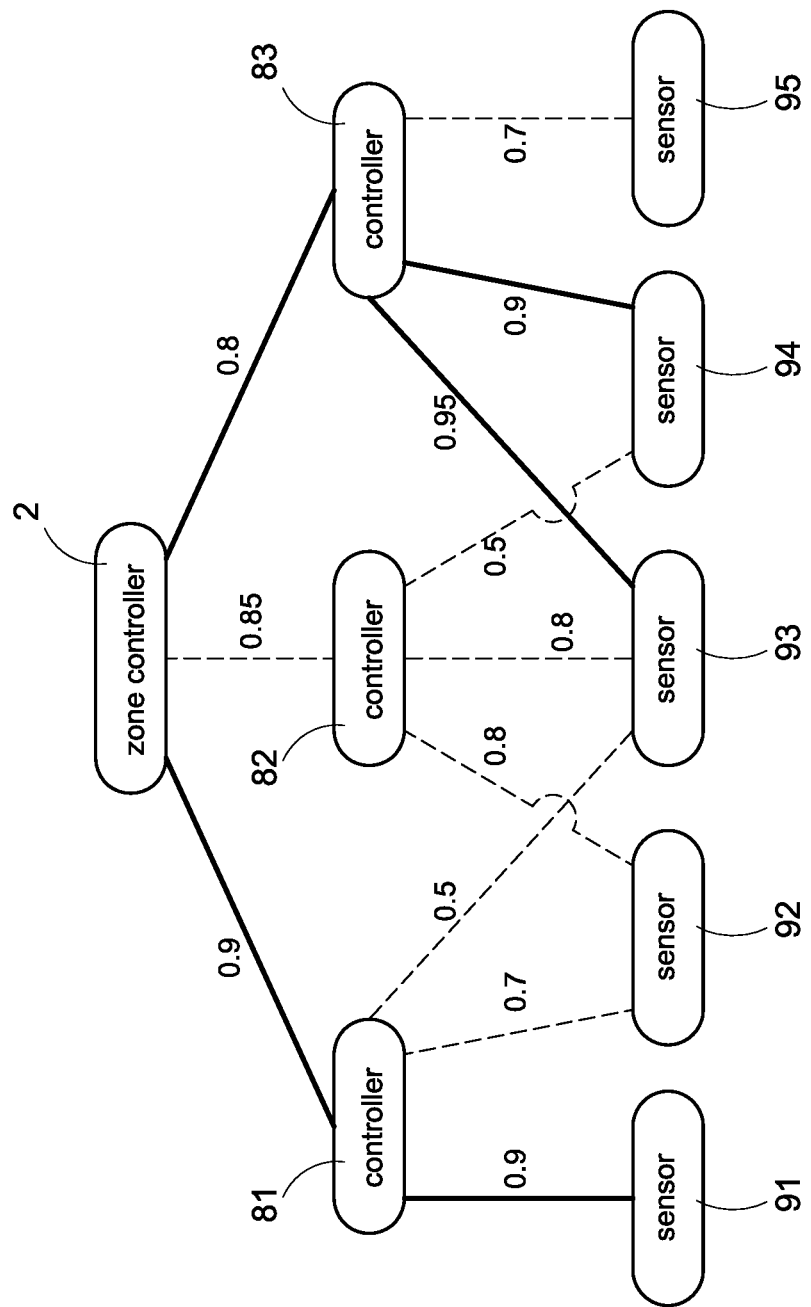
FIG. 9 is a fourth searching operation diagram of the first embodiment according to the present invention.

Next, as illustrated in FIG. 9, the controller 83 performs searching and calculation based on the second sub-relational structure information 72 and determines connection to the two sensors 93 and 94 as the best solution. Specifically, the controller 83 has a relation level of 0.8 to the zone controller 2 and has a relation level of 0.925, i.e. (0.95+0.9)/2, to the two sensors 93 and 94 and their multiplication value is 0.8×0.925=0.74. In this example, because the controller 83 has a search result that has a higher multiplication value than that of the controller 82, the search result of the controller 82 is skipped and the search result of the controller 83 is taken as the best search result corresponding to the second sub-relational structure information 72.

In the invention, the searching in FIG. 7 to FIG. 9 are executed in parallel to decrease searching time. When the controllers 81-83 perform searching, only one or more sensors with highest relation levels are searched to effectively decrease searching time. Take the controller 81 as an example. If the received sub-relational structure information only has a sensor, the controller 81 only keeps the sensor 91 with relation level of 0.9. If the sub-relational structure information includes two sensors, the controller 81 keeps the sensor 91 with relation level of 0.9 and the sensor 92 with relation level of 0.7. In other words, although the sensors with relation levels higher than the standard value are kept, but not necessary be included into consideration in the best search result.

In the embodiment of FIG. 6 to FIG. 9, the controller 81 searches and calculates the best search result corresponding to the first sub-relational structure information 71 that includes a sensor, and the controllers 82 and 83 respectively search the second sub-relational structure information 72 that includes two sensors. However, in other examples, the controllers 81-83 may search all possible combination to ensure best result is found.

In addition to the examples illustrated in FIG. 6 to FIG. 9, there are other combinations. For example, the controller 82 searches and calculates the best search result corresponding to the first sub-relational structure information 71 and the controllers 81 and 83 respectively search the best search result corresponding to the second sub-relational structure information 72. Or, the controller 83 searches and calculates the best search result corresponding to the first sub-relational structure information 71 and the controllers 81 and 82 respectively search and calculate the best search result corresponding to the second sub-relational structure information 72. Or, the controller 81 searches and calculates the best search result corresponding to the second sub-relational structure information 72 and the controllers 82 and 83 respectively search and calculate the best search result corresponding to the first sub-relational structure information 71. Any other combination may also be taken.

For example, after the search of FIG. 6 to FIG. 9 is completed, the zone controller 2 may have a set of best search results. Next, the controllers 81-83 may continue searching based on other combinations.

Figure 10:
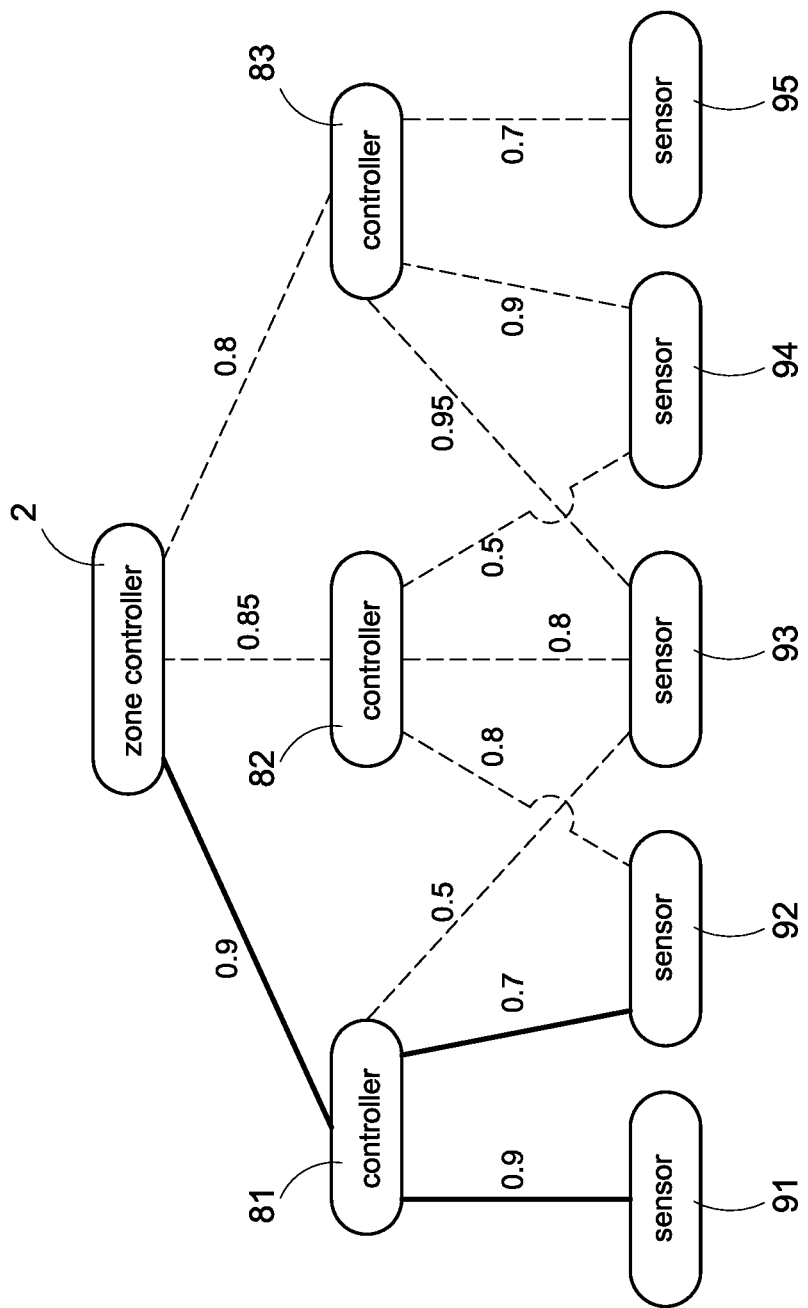
FIG. 10 is a first searching operation diagram of a second embodiment according to the present invention.
Figure 11:
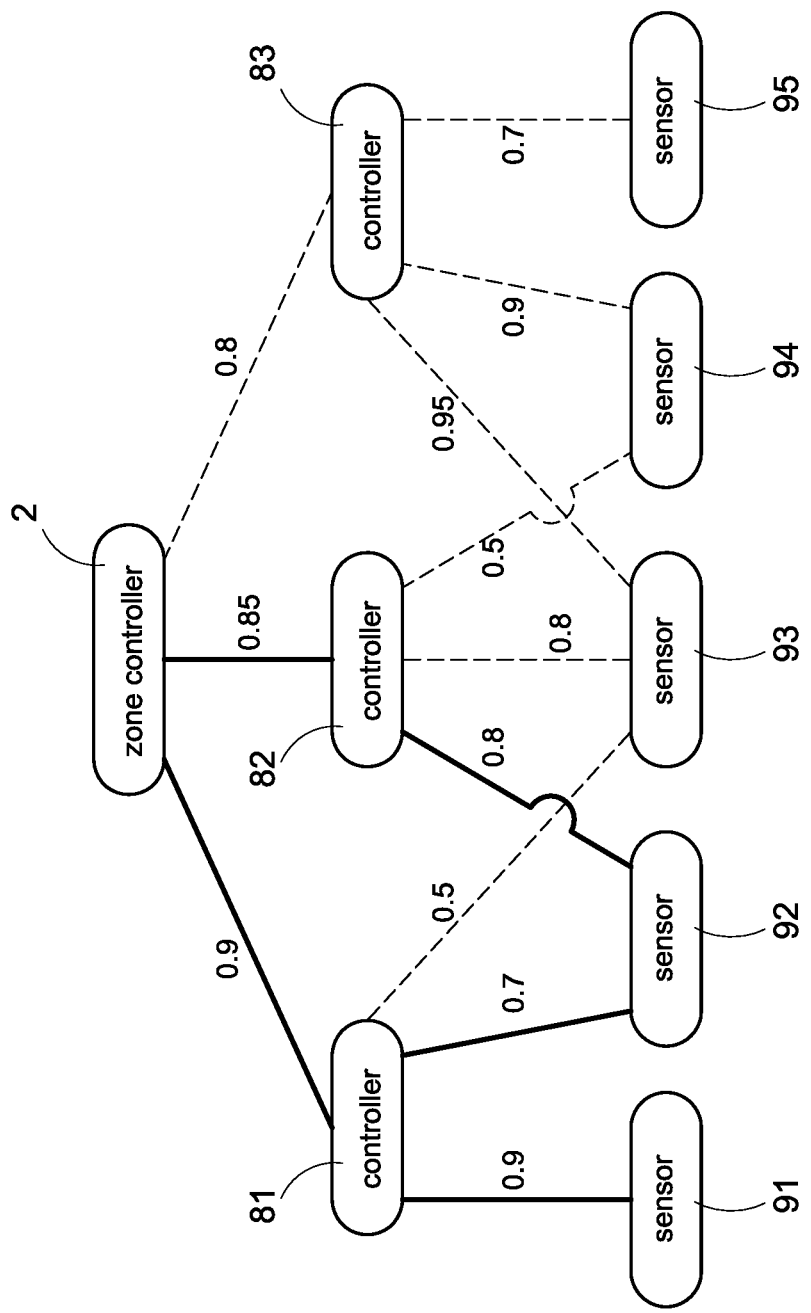
FIG. 11 is a second searching operation diagram of the second embodiment according to the present invention.
Figure 12:
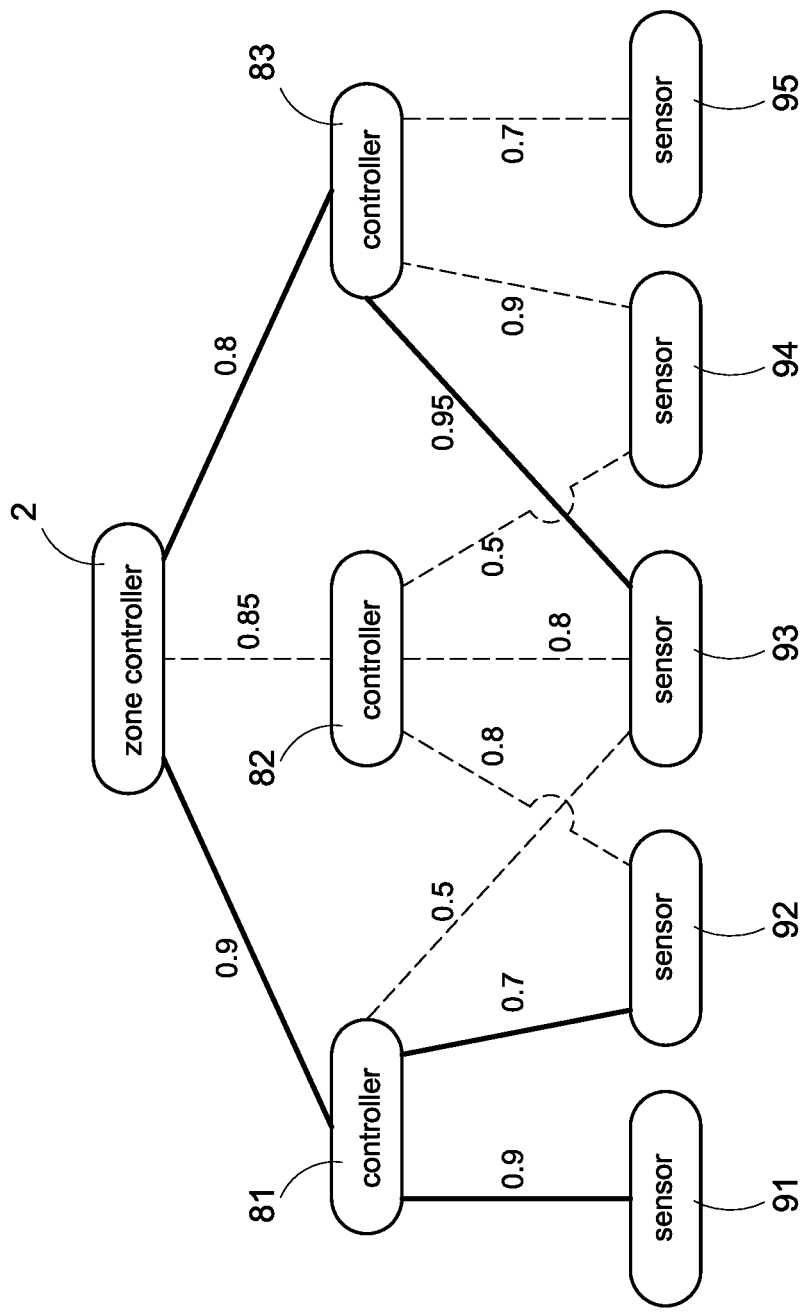
FIG. 12 is a third searching operation diagram of the second embodiment according to the present invention.

Please refer to FIG. 10, FIG. 11 and FIG. 12, which illustrate the first searching operation, the second searching operation and the third searching operation for the second embodiment according to the present invention. First, as illustrated in FIG. 10, the controller 81 searches and calculates to determine connecting to the two sensors 91 and 92 as the best solution according to the second sub-relational structure information 72. Specifically, the controller 81 has a relation level 0.9 to the zone controller 2 and a relation levels 0.8 to the two sensors 91 and 92, i.e. (0.9+0.7)/2, and their multiplication value is (0.9*0.8)=0.72. The controller 81 keeps the search result and uses it as the best search result corresponding to the second sub-relational structure information 72.

As illustrated in FIG. 11, the controller 81 is set as the provider for the best search result corresponding to the second sub-relational structure information 72. Thus, the controller 82 performs searching and calculation according to the first sub-relational structure information 71. In this example, after the controller 81 searches and calculates, connection to the sensor 92 or 93 is determined the best solution (the sensor 92 taken as an example here). Specifically, the controller 82 has a relation level 0.85 to the zone controller 2 and has a relation level 0.8 to the sensor 92 and their multiplication value is (0.85*0.8)=0.68. The controller 82 keeps the search result.

Next, as illustrated in FIG. 12, the controller 83 also searches and calculates according to the first sub-relational structure information 71 and determines connection to the sensor 93 as the best solution. Specifically, the controller 83 has a relation level 0.8 to the zone controller 2 and has a relation level 0.95 to the sensor 93, and the multiplication value is (0.8*0.95)=0.76. In this example, because the multiplication value of the search result of the controller 83 is higher than the multiplication value of the search result of the controller 82, the search result of the controller 82 is skipped and the search result of the controller 83 is taken as the best search result corresponding to the first sub-relational structure information 71.

As mentioned above, when all combinations are searched and calculated, the zone controller 2 gets the best search result of the controller 81 and the controller 83, and instructs the controller 81 to connect to the sensor 91 to establish sub-relational structure corresponding to the first sub-relational structure information 71, and instructs the controller 83 to connect to the sensor 93,94 to establish sub-relational structure corresponding to the second sub-relational structure information 72. Finally, the zone controller 2 connects the two controllers 81,82 to establish a corresponding relational structure for the located area based on the two sub-relational structures.

Please be noted that in the example, the solution with highest relation level corresponding to the sub-relational structure information is taken as the best search result, but this is not a limitation to the invention scope. In other embodiments, the relation level may be set as smaller for better and a solution that has the lowest relation level is chosen as the best search result corresponding to the sub-relational structure information.

As mentioned above, if the relation level is set as smaller for better to find the best search result, searching operation is accelerated. For example, if the controller 81 has a summed value 0.5 of relation levels to the zone controller 2 and to the sensor 91, and the controller 82 has a relation level 0.6 to the zone controller 2, the controller 82 does not need to search and calculate relation levels to the sensors, because no matter what are the relation levels for the controller 82 to the sensors 92, 93, 94, the summed value is larger than 0.5 and will not be the best search result. With such, search time for the controllers 81,82,83 is effectively decreased to increase the search speed of the best search result.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An optimization method for relational structure, comprising:
  a) a zone controller receiving relational structure information, wherein the relational structure information comprises a relational structure composed of the zone controller and multiple groups of sub-relational structures;
  b) retrieving multiple groups of sub-relational structure information from the relational structure information by the zone controller;
  c) classifying the multiple groups of sub-relational structure information to generate a classified result by the zone controller, wherein the multiple groups of sub-relational structure information separately correspond to types, number and connection relation among multiple equipment controllers and sensors of corresponding sub-relational structure;
  d) separately executing an optimized searching procedure for each type of the sub-relational structure according to the classified result by the zone controller, and the executed optimized searching procedure comprises following steps:
    d1) searching multiple equipment controllers of same type located nearby according to the type of the sub-relational structure information by the zone controller;
    d2) respectively calculating a first relation level to each of the equipment controllers by the zone controller;
    d3) transmitting the sub-relational structure information to the equipment controllers by the zone controller;
    d4) respectively searching multiple sensors of the same type located nearby according to the received sub-relational structure information by each of the equipment controllers;
    d5) respectively calculating a second relation level to each of the sensors by each of the equipment controllers;
    d6) calculating a statistic value of the first relation level and each of the second relation levels by each of the equipment controllers respectively;
    d7) keeping a solution of a highest statistic value for matching the content of the sub-relational structure information as an optimized search result, and replying to the zone controller with the optimized search result by each of the equipment controllers respectively;
  e) separately retrieving the optimized search result for each type of the sub-relational structures by the zone controller;
  f) respectively establishing the sub-relational structure of each type according to the optimized search result by the zone controller; and
  g) connecting the sub-relational structures to establish the relational structure by the zone controller.

2. The optimization method of claim 1, wherein the multiple groups of sub-relational structure information respectively comprise corresponding type and number of the equipment controllers, type and number of the sensors, and connection relation between the equipment controllers and the sensors.

3. The optimization method of claim 2, wherein the zone controller, the equipment controller and the sensor are located at one same zone.

4. The optimization method of claim 2, wherein in the step c), the multiple groups of sub-relational structure information are classified according to the type of the equipment controller and the sensor of the multiple groups of sub-relational structure information.

5. The optimization method of claim 4, wherein the equipment controller is a fan controller, a light controller or a shielding controller, and the sensor is a temperature/humidity sensor, a pyroelectric infrared illumination sensor or an illumination sensor.

6. The optimization method of claim 5, wherein one or multiple groups of the sub-relational structure information that comprises the fan controller and the temperature/humidity sensor is classified into one same type, one or multiple groups of the sub-relational structure information that comprises the light controller and the pyroelectric infrared sensor is classified into one same type, and one or multiple groups of the sub-relational structure information that comprises the shielding controller and the illumination sensor is classified into one same type.

7. The optimization method of claim 4, wherein the statistic value is a multiplication value of the first relation level and each of the second relation levels.

8. The optimization method of claim 4, wherein the statistic value is a summed value of the first relation level and each of the second relation levels.

9. The optimization method of claim 4, wherein in the step d1), the zone controller searches the multiple equipment controllers of the same type located nearby according to type of the sub-relational structure information for respectively calculating the first relation level to the equipment controllers and keep one or more of the equipment controllers with the first relation level higher than a standard value.

10. The optimization method of claim 9, wherein in the step d4), the equipment controllers respectively search multiple sensors of the same type located nearby according to the type of the sub-relation structure information for respectively calculating the second relation level to the sensors and keep one or more of the sensors with the second relation level higher than the standard value.

11. The optimization method of claim 10, wherein the first relation level is calculated according to distance and signal strength between the zone controller and the equipment controllers, and the second relation level is calculated according to distance and signal strength between the equipment controllers and the sensors.

12. The optimization method of claim 11, wherein the distance and the signal strength between the zone controller and the equipment controllers and the distance and the signal strength between the equipment controller and the sensors are calculated via a positioning technology.

13. The optimization method of claim 4, wherein in the step of d1), the search result of the zone controller excludes one or more equipment controllers being tagged, and the search results of the equipment controllers exclude one or more sensors being tagged.

14. A relational structure of wireless nodes located in a zone, comprising:

a zone controller having a relational structure information, wherein the zone controller retrieves multiple groups of sub-relational structure information from the relational structure information and classifies the multiple groups of sub-relational structure information for generating a classified result;

multiple equipment controllers respectively connected to and controlling an electronic device in the zone; and multiple sensors for sensing an environment parameter of the zone;

wherein the multiple groups of sub-relational structure information respectively comprise type and number of the equipment controllers, type and number of the sensors and connection relation between the equipment controllers and the sensors for a corresponding sub-relational structure;

wherein the zone controller respectively executes an optimized solution search procedure of the sub-relational structure for each type according to the classified result for searching multiple equipment controllers of the same type located nearby according to the type of the sub-relational structure information and respectively calculating a first relation level to each of the equipment controllers, and the zone controller transmits the sub-relational structure information to the equipment controllers of the same type;

wherein each of the equipment controllers respectively searches multiple sensors of the same type located nearby according to the received sub-relational structure information and respectively calculate a second relation level to each of the sensors;

wherein each of the equipment controllers respectively calculate a statistic value of the first relation level and each of the second relation levels and respectively keep a solution of a highest statistic value for matching the content of the sub-relational structure information as an optimized search result and reply to the zone controller with the optimized search result;

wherein the zone controller respectively retrieves the optimized search result of the sub-relational structure for each type, and the zone controller establishes the sub-relational structure for each type by controlling the equipment controllers according to the optimized search result and connects the sub-relational structures to establish a relational structure.

15. The relational structure of claim 14, wherein the zone controller classifies the multiple groups of sub-relational structure information according to the types of the equipment controllers and the sensors included in the multiple groups of sub-relational structure information, wherein the equipment controllers comprise a fan controller, a light controller or a shielding controller, the sensors comprise a temperature/humidity sensor, a pyroelectric infrared sensor or an illumination sensor, and one or more sub-relational structure information that includes the fan controller and the temperature/humidity sensor are classified into one same type, one or more sub-relational structure information that includes the light controller and the pyroelectric infrared sensor are classified into one same type, and one or more sub-relational structure information that includes the shielding controller and the illumination sensor are classified into one same type.

16. The relational structure of claim 15, wherein the statistic value is a multiplication value or a summed value of the first relation level and the second relation level.

17. The relational structure of claim 15, wherein the first relation level is calculated according to distance and signal between the zone controller and the equipment controllers, and the second relation level is calculated according to distance and signal distance between the equipment controllers and the sensors.

18. The relational structure of claim 15, wherein the equipment controllers and the sensors have tag functions, the search result of the zone controller excludes one or more equipment controllers being tagged, and the search result of the equipment excludes one or more sensors being tagged.

* * * * *